(12) United States Patent
Lou et al.

(10) Patent No.: US 12,555,765 B2
(45) Date of Patent: *Feb. 17, 2026

(54) INTERMEDIATE STRUCTURE AND PREPARATION METHOD THEREFOR, AND LITHIUM SECONDARY BATTERY ELECTRODE AND PREPARATION METHOD THEREFOR

(71) Applicant: GUANGDONG GENIUS TECHNOLOGY CO., LTD., Dongguan (CN)

(72) Inventors: Linzhen Lou, Dongguan (CN); Chunli Shang, Dongguan (CN)

(73) Assignee: GUANGDONG GENIUS TECHNOLOGY CO., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/936,685

(22) Filed: Nov. 4, 2024

(65) Prior Publication Data

US 2025/0062312 A1 Feb. 20, 2025

Related U.S. Application Data

(63) Continuation of application No. PCT/CN2022/113104, filed on Aug. 17, 2022.

(30) Foreign Application Priority Data

Jun. 14, 2022 (CN) .......................... 202210672974.9

(51) Int. Cl.
H01M 4/04 (2006.01)
H01M 4/36 (2006.01)
(Continued)

(52) U.S. Cl.
CPC ....... *H01M 4/0433* (2013.01); *H01M 4/0423* (2013.01); *H01M 4/0428* (2013.01);
(Continued)

(58) Field of Classification Search
None
See application file for complete search history.

(56) References Cited

U.S. PATENT DOCUMENTS 7,410,728 B1 8/2008 Fujimoto et al.
7,851,089 B2* 12/2010 Kogetsu ............... H01M 4/661
429/238

(Continued)

FOREIGN PATENT DOCUMENTS

CN 1633518 A 6/2005
CN 1983681 A 6/2007
(Continued)

OTHER PUBLICATIONS

First Office Action issued in counterpart Chinese Patent Application No. 202210672974.9, dated May 31, 2024.
(Continued)

*Primary Examiner* — Tracy M Dove
(74) *Attorney, Agent, or Firm* — Westbridge IP LLC

(57) ABSTRACT

An intermediate structure is used for the preparation of a lithium secondary battery electrode on one side and/or on both sides. The preparation method for an intermediate structure includes the following steps: laminating a film on one side and/or on both sides of a substrate, and forming through holes in the film, the central axis of the through holes being perpendicular to the plane of the substrate; wherein, the substrate is a conductive substrate, and the film is a flexible polymer film; growing conductive materials in the through holes to form a one-dimensional columnar
(Continued)

structure perpendicular to the substrate in the through holes; and removing the film to obtain an intermediate structure.

9 Claims, 5 Drawing Sheets

(51) Int. Cl.
    *H01M 4/62* (2006.01)
    *H01M 4/70* (2006.01)
    *H01M 4/02* (2006.01)

(52) U.S. Cl.
    CPC ........... *H01M 4/045* (2013.01); *H01M 4/366* (2013.01); *H01M 4/628* (2013.01); *H01M 4/70* (2013.01); *H01M 2004/027* (2013.01)

(56) References Cited

U.S. PATENT DOCUMENTS

| | | | |
|---|---|---|---|
| 2003/0150384 A1 | 8/2003 | Baude et al. | |
| 2007/0031733 A1* | 2/2007 | Kogetsu | H01M 4/0426 429/231.95 |
| 2007/0148337 A1 | 6/2007 | Nichols et al. | |
| 2007/0166613 A1 | 7/2007 | Kogetsu et al. | |
| 2008/0102359 A1 | 5/2008 | Kogetsu et al. | |
| 2009/0316335 A1 | 12/2009 | Simon et al. | |
| 2010/0216026 A1 | 8/2010 | Lopatin et al. | |
| 2011/0189510 A1* | 8/2011 | Caracciolo | H01M 4/134 977/890 |
| 2013/0122374 A1 | 5/2013 | Verbrugge et al. | |
| 2013/0130077 A1* | 5/2013 | El-Ashry | H01M 4/70 427/78 |
| 2014/0342236 A1* | 11/2014 | Goyal | H01M 4/1395 429/209 |
| 2017/0222216 A1 | 8/2017 | Woo et al. | |
| 2022/0052347 A1 | 2/2022 | Jeon et al. | |

FOREIGN PATENT DOCUMENTS

| | | |
|---|---|---|
| CN | 101136466 A | 3/2008 |
| CN | 101713916 A | 5/2010 |
| CN | 102016128 A | 4/2011 |
| CN | 102405545 A | 4/2012 |
| CN | 103219490 A | 7/2013 |
| CN | 105247704 A | 1/2016 |
| CN | 106848328 A | 6/2017 |
| CN | 107078289 A | 8/2017 |
| CN | 107799723 A | 3/2018 |
| CN | 107887572 A | 4/2018 |
| CN | 108089398 A | 5/2018 |
| CN | 111029588 A | 4/2020 |
| JP | 2002170554 A | 6/2002 |
| JP | 2008181835 A | 8/2008 |
| JP | 2010262843 A | 11/2010 |
| JP | 2011216193 A | 10/2011 |
| JP | 5479775 B2 * | 4/2014 |
| WO | 2009115230 A3 | 9/2009 |

OTHER PUBLICATIONS

He et al., Functional Polymer Materials, 2016, pp. 253, Huazhong University of Science and Technology Press, Wuhan, dated Aug. 31, 2016.
International Search Report issued in corresponding PCT Application No. PCT/CN2022/113104, dated Dec. 21, 2022.
Jacobeon, Imaging systems-mechanisms and applications of established and new photosensitive processes, 1983, pp. 199, Chemical Industry Press, Beijing, dated Apr. 30, 1983.
Jooybari et al., Copper Nano- and Micro wires Electrodeposited in Etched Cellulose Nitrate and Makrofol KG Nuclear Track Detector, Physics Procedia, 2015, vol. 80, pp. 41-45, dated Dec. 12, 2015.
Liu, Preparation of three-dimensional ultralight nickel current collector and its application in lithium-oxygen batteries, Master's Thesis submitted to Nanjing University, dated Aug. 15, 2021.
Notification to Grant Patent Right for Invention issued in counterpart Chinese Patent Application No. 202210672974.9, dated Jan. 15, 2025.
Second Office Action issued in counterpart Chinese Patent Application No. 202210672974.9, dated Aug. 31, 2024.

\* cited by examiner

INTERMEDIATE STRUCTURE AND PREPARATION METHOD THEREFOR, AND LITHIUM SECONDARY BATTERY ELECTRODE AND PREPARATION METHOD THEREFOR

CROSS-REFERENCE TO RELATED APPLICATIONS

This application is a continuation of International Application No. PCT/CN2022/113104, filed on Aug. 17, 2022, which claims priority to Chinese Patent Application No. 202210672974.9, filed on Jun. 14, 2022, both of which are hereby incorporated by reference in their entireties.

TECHNICAL FIELD

The present application relates to the technical field of lithium secondary battery materials, and in particular to an intermediate structure for preparing a lithium secondary battery electrode and a preparation method therefor, and a lithium secondary battery electrode and a preparation method therefor.

BACKGROUND

At present, an electrode commonly used in a lithium secondary battery is a graphite negative electrode, which has a mature process and stable mass production. However, due to the limited lithium-intercalation capacity of the graphite negative electrode, the performance improvement of the lithium secondary battery is also limited. Research has shown that materials such as silicon, germanium or tin have higher lithium-intercalation capacity as lithium secondary battery negative electrodes. Taking silicon as negative electrode material of a lithium secondary battery as an example, a theoretical maximum lithium-intercalation capacity reaches 4200 mAh/g, which is much higher than that of a commonly used graphite negative electrode. However, silicon material itself has some disadvantages that limit its application as a lithium secondary battery negative electrode, especially the application of alloy-type anode materials such as silicon material as the negative electrodes of lithium secondary batteries in the form of a one-dimensional structural material, which is difficult to realize the mass production at present.

The difficulty to realize its mass production application is mainly because of limitations of various synthesis methods of one-dimensional structural materials themselves. Etching method, self-growth method and template method are the main methods for preparing one-dimensional structure materials. Among them, etching method and self-growth method are difficult to ensure the consistency of one-dimensional structure materials, and easy to make the growth directions of one-dimensional structure materials disorderly and easily agglomerated, which is difficult to be applied on a large scale. The template method usually uses anodized aluminum template, but due to the production process and structural characteristics of anodized aluminum, the manufacturing cost is very high, and it is difficult to produce a large area. At present, it is limited to the laboratory research stage, and it is also difficult to realize the mass production application.

SUMMARY

Embodiments of the present application disclose an intermediate structure for preparing a lithium secondary battery electrode and a preparation method therefor, and a lithium secondary battery electrode and a preparation method therefor, so as to solve the problem that a lithium secondary battery negative electrode in the form of a one-dimensional structure is difficult to achieve mass production.

In a first aspect, embodiments of the present application provide a preparation method for an intermediate structure, which is used for preparing a lithium secondary battery electrode on one side and/or both sides and includes the following steps:
synthesizing a template: laminating a film on one side and/or both sides of a substrate, and forming the film with through holes, central axes of the through holes being perpendicular to a plane of the substrate; wherein the substrate is a conductive substrate, and the film is a flexible polymer film;
growing: growing conductive material in the through holes such that a one-dimensional columnar structure perpendicular to the substrate is formed in the through holes; and
removing the film: removing the film and obtaining the intermediate structure.

Further, the step of synthesizing a template is: bonding the film to the substrate through an adhesive layer, and both the film and the adhesive layer are formed with the through holes.

Further, the step of synthesizing a template includes:
subjecting the film to an ion track etching process to obtain the through holes, printing or spraying the adhesive layer on the film with the through holes, and the adhesive layer exposing at least some of the through holes; and
bonding the film formed with the adhesive layer to the substrate through the adhesive layer by hot pressing to obtain the template.

Further, the step of synthesizing a template includes:
coating the adhesive layer on the film not formed with the through holes, and subjecting the film coated with the adhesive layer to an ion track etching process, so that both the adhesive layer and the film are formed with the through holes; and
bonding the film formed with the through holes to the substrate through the adhesive layer formed with the through holes by hot pressing to obtain the template.

Further, the step of synthesizing a template includes:
coating the adhesive layer on the film not formed with the through holes;
bonding the film formed with the adhesive layer to the substrate through the adhesive layer by hot pressing; and
subjecting the film and the adhesive layer bonded on the substrate to the ion track etching process, so that the film and the adhesive layer are formed with the through holes.

Further, conditions of the ion track etching process include: bombarding with heavy ions and irradiating at an irradiation power of 2000 KW to 10000 KW for 0.5 s to 200 s.

Further, the conditions of the ion track etching process include: an etching solution is an alkaline solution, and etching time is 5 min to 30 min.

Further, the adhesive layer adopts at least one of PVDF (polyvinylidene difluoride, PVDF for short) and conductive adhesive.

Further, the step of synthesizing a template includes:
subjecting the film to the ion track etching process to obtain the through holes;

pre-plating a first metal layer on the film formed with the through holes by physical vapor deposition; and plating a second metal layer on the first metal layer to form the substrate such that the film formed with the through holes is plated with the substrate to form the template.

Further, the through holes has a hole diameter of 10 nm to 50 μm, and/or, a hole density of the through holes is $10^5/cm^2$ to $10^8/cm^2$, and/or a thickness of the film is 2 μm to 50 μm, and/or a length-to-diameter ratio of the thickness of the film to the hole diameter of the through holes is 1:3 to 3:1.

Further, the through holes has a hole diameter of 5 μm to 30 μm, and/or, the hole density of the through holes is $400000/cm^2$ to $2000000/cm^2$, and/or the thickness of the film is 15 μm to 50 μm, and/or the length-to-diameter ratio of the thickness of the film to the hole diameter of the through holes is 1:1 to 3:1.

Further, the step of synthesizing a template includes:

pre-treating the substrate for impurity removal;

coating a dry film on one side and/or both sides of the substrate after pre-treatment; and exposing, developing, and etching the dry film to obtain the template with the dry film formed with the through holes.

Further, the through holes has a hole diameter of 5 μm to 30 μm, and/or, the thickness of the film is 5 μm to 30 μm, and/or, a length-to-diameter ratio of the thickness of the film to the hole diameter of the through holes is 1:3 to 3:1, and/or, a pore spacing of adjacent through holes is 5 μm to 20 μm.

Further, in the step of growing, a method of growing the conductive material in the through holes is one of physical vapor deposition, electroplating, chemical plating or chemical vapor deposition.

Further, in the step of removing the film, a method of removing the film employs one of mechanical stripping, chemical etching or vacuum sintering.

Further, a diameter of the one-dimensional columnar structure is 5 μm to 30 μm, a height of the one-dimensional columnar structure is 15 μm to 50 μm, and a height-to-diameter ratio of the one-dimensional columnar structure is 3:1 to 1:1.

Further, the one-dimensional columnar structure includes a plurality of regularly distributed columns, and a spacing between adjacent columns is 5 μm to 20 μm; or the one-dimensional columnar structure includes a plurality of irregularly distributed columns.

Further, the substrate is at least one of a copper foil substrate, a nickel foil substrate, and a stainless steel substrate.

Further, the polymer film is at least one of PTFE (poly tetra fluoroethylene, PTFE for short) film, PET (polyethylene glycol terephthalate, PET for short) film, PP (polypropylene, PP for short) film, PC (polycarbonate, PC for short) film or PI (polyimide, PI for short) film.

Further, the conductive material is at least one of copper, nickel, or carbon.

In a second aspect, the embodiments of the present application provide an intermediate structure for preparing a lithium secondary battery electrode on one and/or both sides. The intermediate structure is prepared by the preparation method according to the first aspect and includes the substrate and the one-dimensional columnar structure perpendicularly grown on the substrate.

Further, a diameter of the one-dimensional columnar structure is 5 μm to 30 μm, a height of the one-dimensional columnar structure is 15 μm to 50 μm, and a height-to-diameter ratio of the one-dimensional columnar structure is 3:1 to 1:1.

Further, the one-dimensional columnar structure includes a plurality of regularly distributed columns, and a spacing between adjacent columns is 5 μm to 20 μm; or the one-dimensional columnar structure includes a plurality of irregularly distributed columns.

In a third aspect, the embodiments of the present application provide a preparation method for a lithium secondary battery electrode, including the following steps:

coating an outer surface of the one-dimensional columnar structure of the intermediate structure prepared by the preparation method according to the first aspect with electrode active material and forming an active material layer; and coating a protective layer on an outer surface of the active material layer and obtaining the lithium secondary battery electrode.

Optionally, the electrode active material is at least one of silicon, germanium, or tin.

Optionally, material of the protective layer is carbon or metal oxide.

Further, a method of coating the electrode active material includes chemical vapor deposition, physical vapor deposition or electroplating.

Further, a method of coating the protective layer includes hydrothermal, physical vapor deposition or chemical vapor deposition.

In a fourth aspect, the embodiments of the present application provide a lithium secondary battery electrode obtained by the preparation method for a lithium secondary battery electrode according to the third aspect, the lithium secondary battery electrode including:

a substrate, wherein the substrate is a conductive substrate;

a one-dimensional columnar structure grown on one side and/or both sides of the substrate and perpendicular to a plane where the substrate is located, wherein the one-dimensional columnar structure is a conductive structure;

an active material layer located on the substrate and perpendicular to the plane where the substrate is located, wherein the active material layer covers an outer surface of the one-dimensional columnar structure; and a protective layer located on the substrate and perpendicular to the plane where the substrate is located, wherein the protective layer covers an outer surface of the active material layer.

Compared with related technologies, the embodiments of the present application have following beneficial effects.

On the one hand, the intermediate structure provided by the embodiments of the present application can make use of the substrate to have a good mechanical support function for the one-dimensional columnar structure; on the other hand, the one-dimensional columnar structure perpendicular to the substrate can not only serve as a support body for the subsequently grown electrode active material and have a rigid support function, but also have a conductive capability, which is beneficial to improve the conductive capability between the subsequently grown electrode active material and the conductive substrate, thereby improving the electrode performance of the lithium secondary battery. In the preparation method for the intermediate structure, the film used during the synthesis of the template, which is a flexible polymer film, not only has the advantage of low manufacturing cost, but also can realize mass production as it can be made into a coiled material due to its softness, which is convenient for synthesis of the large-area template.

BRIEF DESCRIPTION OF THE DRAWINGS

To describe the technical solutions in embodiments of the present application more clearly, the following briefly describes the accompanying drawings for embodiments. It is clear that the accompanying drawings in the following description show merely some embodiments of the present application, and a person of ordinary skill in the art may derive other drawings from these accompanying drawings without creative efforts.

DETAILED DESCRIPTION OF THE EMBODIMENTS

Figure 1:
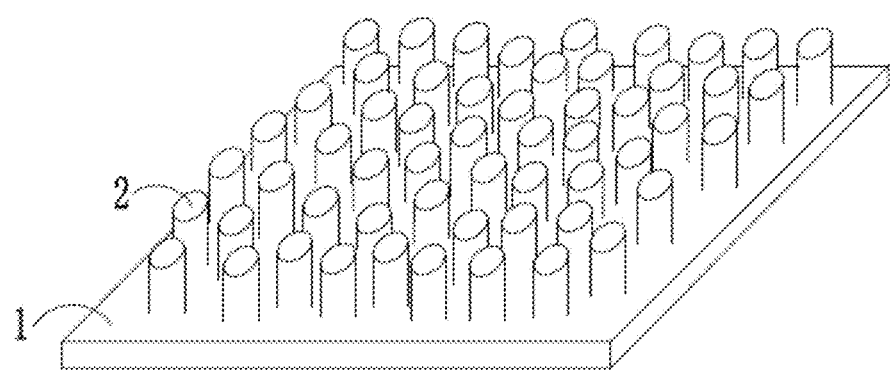
FIG. 1 is a schematic view showing a structure of an intermediate structure according to Embodiment I.

The following clearly describes the technical solutions in embodiments of the present application with reference to the accompanying drawings in embodiments of this application. It is clear that the described embodiments are some but not all of embodiments of the present application. All other embodiments obtained by a person of ordinary skill in the art based on embodiments of the present application without creative efforts shall fall within the protection scope of this application.

In the present application, the orientation or positional relationship indicated by the terms "on", "under", "left", "right", "front", "back", "top", "bottom", "inside", "outside", "middle", "vertical", "horizontal", "transverse", "longitudinal" and the like is based on the orientation or positional relationship shown in the drawings. These terms are mainly intended to better describe the present application and its embodiments and are not intended to limit that the indicated devices, elements or constituents must have a particular orientation, or be constructed and operated in a particular orientation.

Also, in addition to being used to represent an orientation or positional relationship, some of the above terms may also be used to indicate other meanings. For example, the term "on" may also be used in some cases to denote a certain attachment or connection. The specific meanings of these terms in the present application may be understood by those ordinarily skilled in the art as the case may be.

In addition, the terms "installation", "setting", "being provided with", "connecting", "connected", "sleeving" should be understood broadly. For example, the connection may be a fixed connection, a detachable connection or an integrated construction, or may be a mechanical connection or an electrical connection, or may be a direct connection, or may be an indirect connection through an intermediary, or an internal communication between two devices, elements or constituents. The specific meanings of the above terms in the present application may be understood by those ordinarily skilled in the art as the case may be.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

Hereinafter, the technical solution of the present application will be described in detail with reference to the drawings and in connection with embodiments.

Since materials such as silicon, germanium or tin have a high lithium-intercalation capacity as a negative electrode material of a lithium secondary battery, which is much higher than that of the graphite negative electrode currently used on the market, these materials belong to the negative electrode material of the lithium secondary battery with development prospects. However, there are some defects in these materials. Taking silicon as an example, the conductivity of silicon is worse than that of graphite, and the multiplicity performance is poor. The volume expansion of silicon is too large in the circulation process, which may easily lead to particle fragmentation and differentiation of electrode material, damage the solid electrolyte interface film, and cause capacity rapid decline, which limits the application of silicon as negative electrode material.

Although it is possible to solve the above-mentioned problems by fabricating the alloy-type negative electrode material such as silicon into a one-dimensional structural form, due to the limitation of the synthesis method of the one-dimensional structural material, the lithium secondary battery negative electrode material having such a structural form is difficult to be truly mass-produced, and the related art is only in a laboratory research stage.

Specifically, the preparation methods for synthesizing one-dimensional structural materials in the related art mainly include an etching method, a self-growth method and a template method. Among them, the etching method and the self-growth method are difficult to ensure consistency of one-dimensional structure materials, and easy to make the growth direction of one-dimensional structure materials disorderly and easily agglomerated, and are difficult to be applied on a large scale. The template method most commonly uses an anodized aluminum template, which is generally prepared by anodizing a high-purity aluminum sheet in an acidic solution. Restricted by the manufacturing process thereof and the structural characteristics of the anodized aluminum template itself, the method has the following limitations: firstly, the manufacturing cost is relatively high, and secondly, after intensive research and practical investigation, the applicant understands that it is difficult to manufacture a large-area anodized aluminum template in the industrial production process. At present, the maximum dimension of anodized alumina template is only at a unit level of cm×cm. These two limitations make the research on the synthesis of one-dimensional structural materials using anodized aluminum template mainly focus on the laboratory research stages such as universities and research institutes, but the related process technology is difficult to be applied in industrial mass production. This makes it difficult to synthesize the one-dimensional structural material in large quantities even by using the template method and apply the one-dimensional structural material to the lithium secondary battery electrode material, and ultimately restricts optimization and upgrading of the lithium secondary battery electrode material in actual industrialized production.

Based on the analysis of the above-mentioned problems, the embodiments of the present application provide an intermediate structure for preparing a lithium secondary battery electrode and a preparation method therefor, and a lithium secondary battery electrode and a preparation method therefor. Through optimizing the preparation method for the intermediate structure, the mass production and use thereof in practical industrial production can be realized, and then the mass production of lithium secondary electrode materials in practical industrial production is realized, and finally the lithium secondary battery electrode with improved electrode performance and mass production is obtained.

In a first aspect, the embodiments of the present application provide an intermediate structure for preparing a lithium secondary battery electrode on one and/or both sides, the intermediate structure including a substrate and a one-dimensional columnar structure perpendicularly grown on the substrate. The preparation method for the intermediate structure includes the following steps:

synthesizing a template: laminating a film on one side and/or both sides of a substrate, and forming the film with through holes, central axes of the through holes being perpendicular to a plane of the substrate; wherein the substrate is a conductive substrate, and the film is a flexible polymer film;

growing: growing conductive material in the through holes such that the one-dimensional columnar structure perpendicular to the substrate is formed in the through holes; and removing the film: removing the film and obtaining the intermediate structure.

Among them, the substrate is at least one of a copper foil substrate, a nickel foil substrate, and a stainless steel substrate, and preferably the substrate is a copper foil substrate or a nickel foil substrate. The polymer film is at least one of a PTFE film, a PET film, a PP film, a PC film or a PI film, preferably the polymer film is a PET film. The conductive material is at least one of copper, nickel or carbon.

The intermediate structure for preparing a lithium secondary battery electrode on one and/or both sides means that, in the process of preparing the intermediate structure, when synthesizing the template, either a film with through holes is laminated on one side of the substrate to obtain a one-dimensional columnar structure connected on one side of the substrate using one side of the template, thereby preparing a single-sided lithium secondary battery electrode, or a film with through holes can be laminated on two opposite surfaces of the substrate respectively to obtain a one-dimensional columnar structure connected on both sides of the substrate using both sides of the template, thereby preparing a double-sided lithium secondary battery electrode.

The embodiments of the present application provide an intermediate structure and preparation method therefor used in the preparation of lithium secondary battery electrodes on one side and/or both sides, in which a film with through holes is laminated on one side and/or both sides of a conductive substrate, and one-dimensional columnar structures such as nanowires or micrometer wires are grown by utilizing the through holes, so as to obtain an intermediate structure in which the substrate having conductive properties vertically connecting with the one-dimensional columnar structure having conductive properties.

From a perspective of the structure of the intermediate structure, on the one hand, the intermediate structure can utilize the substrate which is a copper foil substrate, a nickel foil substrate or a stainless steel substrate and has a certain degree of strength, to give a good mechanical support for the one-dimensional columnar structural material during the subsequent preparation of the lithium battery electrodes, and on the other hand, the one-dimensional columnar structure which is perpendicular to the substrate can not only act as a support body for the subsequent growth of the electrode active material and play a rigid support role, but also, because of the conductive ability, is conducive to improving the conductive ability between the electrode active material subsequently growing on it and the conductive substrate, thereby improving the lithium secondary battery electrode performance.

From a perspective of the process of the intermediate structure, the intermediate structure is prepared by first synthesizing a template and then synthesizing the intermediate structure on the basis of the template. The film used for synthesizing the template, which is a flexible polymer film, not only has the advantage of low manufacturing cost, but also can realize mass production as it can be made into a coiled material due to its softness, which is convenient for synthesis of the large-area template. In one realizable production scenario, for example, a large-area substrate is located on a conveyor belt in a production process, a commercially purchased film (i.e., a flexible polymer film) is mounted on a roller in the form of a coiled material. By laminating the film on the substrate and making the film formed with through holes, a large-area template is prepared. The large area refers to a size of dm×dm or above, and may also refer to a size of m×m. The larger the area, the more favorable it is to reduce the cost of mass production. On the basis that the manufacturing of the above template can be mass-produced, the process of growing conductive material in the through holes of the template and then removing the film can also be mass-produced.

It can be seen that, compared with the preparation of conventional one-dimensional materials using anodized aluminum oxide templates, the method using a flexible polymer film as a template for preparing an intermediate structure, as well as the intermediate structure according to the embodiments of the present application, have at least the following obvious advantages in terms of industrial mass production.

First, the optimization of the material properties and the process method makes the templates easier to realize by industrial mass production. On the one hand, as previously mentioned, the embodiments of the present application use a flexible polymer film as the film, and its flexible, rollable and other characteristics make the large-area large-scale industrial mass production of the template itself achievable, which is difficult to realize with an anodized aluminum oxide template. Since the industrial mass production of the template can be realized, the process of making intermediate structures using this template can be industrially mass-produced. On the other hand, the embodiments of the present application directly adopt the conductive material as the conductive substrate, which has the advantage of simplified production process compared to the related technology which realizes a conductive function by adopting a non-conductive substrate, such as a glass substrate, and then sputtering a metal layer.

Second, product performances are optimized so that subsequent production of lithium secondary battery electrodes is more cost-effective and more suitable for mass production. On the one hand, according to the embodiments of the present application, solid adhesion of the substrate and the film can be realized by bonding, which can ensure the stability of the subsequent operation of a perforation process, and not affect the perforation effect or the structural stability of the template because of the easy detachment of the substrate and the film, which in turn ensures the stability of performances of the intermediate structure for making lithium secondary battery electrodes, including the stability of the fabrication process, and the stability of the structural connection and electric connection between the one-dimensional columnar structure and the conductive substrate. On the other hand, the present application carries out aperture processing of the adhesive layer to ensure that the through holes of the film and the conductive substrate are in communication. This in turn ensures that subsequently, the one-dimensional columnar structure of the lithium secondary battery intermediate structure is in direct contact with the conductive substrate. In addition, the substrate directly adopts the conductive substrate, so the overall conductivity is good. However, when producing one-dimensional materials using anodized aluminum templates, even though bonding is used, the adhesive layer is not perforated, so the generated one-dimensional nano materials cannot directly contact the substrate in deed, which makes the conductivity of the overall structure lower.

Not only that, according to microstructural parameters (such as hole diameter, film thickness, length-to-diameter ratio, hole density, etc.) of the through holes in the template of the embodiments of the present application, as well as the scanning electron microscope images of the template produced by the specific embodiments of the present application in the latter part of this application, it can be seen that the one-dimensional columnar structure in the intermediate structure prepared using the template according to the embodiments of the present application is closer to a short and thick columns in its structural morphology in a micrometer level. Such a microstructural morphology enables, on the one hand, the one-dimensional columnar structure to maintain a good perpendicularity with respect to the conductive substrate, and, on the other hand, the columns to be spaced apart from each other. However, the one-dimensional nanomaterials made using the anodized aluminum template are more likely to grow into an elongated morphology microstructure with a finer diameter and a higher height. Such a structure suffers from problems such as the easy agglomeration of the ends of adjacent one-dimensional nanomaterials and the overall poor perpendicularity with respect to the substrate, which in turn leads to the fact that such one-dimensional nanomaterials are unsuitable to be used as intermediate structures for the preparation of lithium secondary battery electrodes.

The steps for synthesizing the template in the preparation method for preparing this intermediate structure are described below.

In an alternative implementation, the step of synthesizing the template includes: bonding the film to the substrate through an adhesive layer, wherein both the film and the adhesive layer are formed with the through holes.

The adhesive layer adopts at least one of PVDF or conductive adhesive.

By providing the adhesive layer on the film, not only a reliable connection between the film and the substrate may be achieved by using the adhesive layer, but also mass production of the template manufacturing process is facilitated. More importantly, according to the embodiments of the present application, a special treatment is also performed on the adhesive layer, and through-holes are also formed on the adhesive layer corresponding to the film, namely, the adhesive layer also forms through holes at positions corresponding to the through holes formed on the film. In other words, the adhesive layer can achieve a reliable connection between the film and the substrate without blocking the communication between the through holes and the substrate. In this way, when one-dimensional columnar structural materials such as nanowires or microwires are subsequently grown in the through holes, these one-dimensional columnar structural materials can have good contact with the substrate having conductive properties, and good electrical contact between the one-dimensional columnar structural material and the conductive substrate can be ensured while mass production is carried out. In addition, the applicant found that in the related art, special perforation is rarely performed on the adhesive layer. It is speculated that, on the one hand, the related art does not pay attention to the communication between the through holes of the template and the substrate. Even if perforation is performed, the perforation is performed on the carbon layer coated on the substrate by sintering, which has low porosity and not obvious perforation effect, increasing the difficulty in subsequent electroplating or deposition of the conductive material in the holes. More importantly, this is different from the concept of directly perforating the adhesive layer in this application. On the other hand, in the related art, if the film and the adhesive layer are to be removed without perforating the adhesive layer, leaving only the substrate and the grown one-dimensional material, then more complicated operations are needed, including removing the film and then removing the adhesive layer. However, the process of removing the adhesive layer will affect the stability of connection between the grown one-dimensional material and the substrate, such that the one-dimensional material will become separated from the substrate and even collapse and agglomeration will occur to part of the one-dimensional material, which is not conducive to the improvement of the performance of the lithium secondary battery electrode prepared subsequently.

It should be noted that the through holes correspondingly formed on the adhesive layer can either expose the through holes of the film completely, i.e. the adhesive layer does not cover the through holes of the film at all, or expose part of the through holes of the film, i.e. the adhesive layer covers part of the through holes of the film and exposes the other part of the through holes. As long as there is a space for the through holes to be exposed, the communication between the through holes and the conductive substrate is ensured, and then good electrical contact between the one-dimensional columnar structural material and the conductive substrate is ensured when the one-dimensional columnar structural material is subsequently synthesized.

In addition, the applicant would like to emphasize that the anodized aluminum template is limited by its own synthesis process, which usually first makes columnar aluminum oxide into hollow aluminum oxide tube, and then forms a substrate on a plurality of hollow aluminum oxide tubes to form the anodized aluminum template. As a result, the anodized aluminum template can synthesize the lithium secondary battery electrode only on one side of the substrate, but cannot synthesize the lithium secondary battery electrode on both sides of the substrate. However, in the embodiments of the present application, the film and the substrate are connected by means of bonding through an adhesive layer, and the film with through holes may be laminated on one side of the substrate, thereby preparing the lithium secondary battery electrode on one side of the template, and the film with through holes may also be laminated on both sides of the substrate, thereby preparing the lithium secondary battery electrode on both sides of the template. The preparation of lithium secondary battery electrode on both sides of the template while realizing mass-production synthesis of the templates and lithium secondary battery electrodes is difficult to realize in the prior art, and is one of the important points of invention of the embodiments of the present application.

In the following, three specific implementation methods for bonding a film to a substrate via an adhesive layer are respectively described.

In a first implementation, the step of synthesizing the template includes: subjecting the film to an ion track etching process to obtain the through holes, printing or spraying the adhesive layer on the film with the through holes, and the adhesive layer exposing at least some of the through holes; bonding the film formed with the adhesive layer to the substrate through the adhesive layer by hot pressing to obtain the template.

On the basis that the film is treated by the ion track etching process to obtain through holes, screen printing the adhesive layer or spraying the adhesive layer on the film formed with the through holes, and performing a special perforation treatment on the adhesive layer, so as to ensure that the adhesive layer can expose part or all of the through holes, ensure that the adhesive layer does not completely cover the through holes, and avoid the isolation between the through holes and the substrate. And then bonding the film formed with the through holes and the substrate via the adhesive layer formed with the through holes by hot pressing, so as to achieve a reliable connection of the film on the substrate, and the through holes between the film and the substrate are not completely covered by the adhesive layer, ensuring the communication between the through holes and the substrate.

Preferably, the adhesive layer does not cover the through holes at all, so that there is no excessive residual adhesive between the through holes and the substrate, and the effect of the residual adhesive on the electrical contact between the subsequently synthesized one-dimensional columnar structure material and the substrate may be avoided, including causing an increase of the impedance of the overall structure of the one-dimensional columnar structure material and the substrate and further affecting the performance of the lithium secondary battery electrode material later.

In a second implementation, the step of synthesizing the template includes: coating an adhesive layer on a film not formed with the through holes, and subjecting the film coated with the adhesive layer to an ion track etching process, so that both the adhesive layer and the film are formed with through holes; bonding the film formed with the through holes to the substrate through the adhesive layer formed with the through holes by hot pressing to obtain the template.

In this implementation, an adhesive layer is firstly coated on the film, so that the adhesive layer is uniformly and densely coated on the film, so as to ensure that a subsequent hot-pressing bonding operation can make the connection between the film and the substrate more reliable. And then the film and the adhesive layer are subjected to the ion track etching process, so that through holes are formed on both of the film and the adhesive layer, so as to ensure the communication between the through holes and the substrate, thereby ensuring good electrical contact between the one-dimensional columnar structure material subsequently manufactured by the template and the substrate.

In a third implementation, the step of synthesizing the template includes:
coating the adhesive layer on the film which has not formed the through holes;
bonding the film formed with the adhesive layer to the substrate through the adhesive layer by hot pressing; and
subjecting the film and the adhesive layer bonded on the substrate to the ion track etching process, so that both the film and the adhesive layer are formed with the through holes.

In this implementation, first, the adhesive layer is coated on the film and hot-pressed to improve the reliability of connection between the film and the substrate, and then the laminated template is perforated. Specifically, the film and the adhesive layer are perforated such that both the film and the adhesive layer are formed with the through holes, which ensures the communication between the through holes and the substrate, thereby ensuring good electrical contact between the one-dimensional columnar structure material subsequently prepared by using this template and the substrate.

In the above three implementations, the perforation of the film, or the film and the adhesive layer is mainly realized by ion track etching, which is a conventional process. However, some key parameters in this process may have a critical impact on important parameters of the through holes, such as hole diameter and hole arrangement density, which may play an important role during the subsequent preparation of the one-dimensional columnar structure material on the template by using the through holes and the preparation of the lithium secondary battery electrode. Therefore, in the embodiments of this application, a lot of research has been conducted on the key parameters of the ion track etching.

In the embodiments of the present application, the conditions of the ion track etching process include: bombardment with heavy ions, irradiation at an irradiation power of 2000 KW to 10000 KW for 0.5 s to 200 s. In addition, the etching solution used in the ion track etching process is an alkaline solution, for example, a sodium hydroxide etching solution having a mass fraction of 10% to 50% is used to etch the film or the film and the adhesive layer for 5 minutes to 30 minutes. In addition, for etching the adhesive layer, different etching solutions may be selected according to the type of adhesive layer used, and when PVDF is used as the adhesive layer, an NMP (i.e., N-methylpyrrolidone) etching solution may be selected as the etching solution.

Within the above irradiation power and irradiation time range, it is advantageous to obtain through holes in which both the hole density and the hole diameter are suitable for producing a lithium secondary battery electrode. In addition, within the concentration of the etching solution and the etching time range, it is beneficial to control to obtain an appropriate through-hole etching depth. And then the height of the subsequent one-dimensional columnar structure material is affected by the control of this parameter.

The irradiation power of 2000 KW to 10000 KW includes any point value within the power range, for example, the irradiation power of 2000 KW, 3000 KW, 5000 KW, 6000 KW, 8000 KW or 10000 KW. The irradiation time is 0.5 s to 200 s, including any point value within the time range, for example, the irradiation time is 0.5 s, 1 s, 5 s, 10 s, 20 s, 50 s, 60 s, 80 s, 100 s, 120 s, 150 s, 180 s or 200 s.

In another optional implementation, the step of synthesizing the template includes:

subjecting the film to the ion track etching process to obtain the through holes;

pre-plating a first metal layer on the film formed with the through holes by physical vapor deposition; and plating a second metal layer on the first metal layer to form the substrate such that the film formed with the through holes is plated with the substrate to form the template.

In the embodiments of the present application, the adhesive layer may be arranged and subjected to special perforation to ensure the reliability of connection between the film and the substrate and the communication between the through holes and the substrate, thereby ensuring good electrical contact between the one-dimensional columnar structure material subsequently generated in the through holes and the substrate, or the film may be perforated by ion track etching first, and then the substrate may be formed on the film formed with the through holes. Specifically, in the embodiments of the present application, a thin first metal layer is pre-plated by physical vapor deposition to create a good electron channel as much as possible at the through-hole position of the film, and this process does not require the metal layer to be densely covered on the film layer. Then, a second metal layer is further electroplated on the thin first metal layer, and the thickness of the overall metal layer is increased by the electroplating process, thereby improving the structural strength of the substrate. It can be understood that the first metal layer and the second metal layer may be the same or different kinds of metals, and the same kind of metal is preferably used, for example, both the first metal layer and the second metal layer are copper layers.

It should be noted that when the first metal layer is pre-plated by physical vapor deposition directly on the film in which the through holes are formed, and a thickened second metal layer is not plated, a template composed of the substrate and the film together cannot be formed, and a specific intermediate structure and a lithium secondary battery electrode cannot be obtained in a subsequent production process. This is because if only the first metal layer is pre-plated by physical vapor deposition on the film formed with through holes, only the metal plating layer on the surface of the film can be obtained, but the position of the through holes cannot be covered. That is, a film with through holes and the first metal layer plated on the surface can be obtained after pre-plating. This thin metal layer (having a thickness of about <1 μm), which is porous and not dense, can provide limited electron channels and cannot function as an effective structural support. If one-dimensional nanowires are directly fabricated on this basis, conductive materials are electrodeposited into the through holes and then the film are removed, only one-dimensional nanowires or wire bundles agglomerated in a small area can be obtained, but one-dimensional columnar structure grown vertically on the conductive substrate cannot be obtained.

However, the embodiments of the present application are not to obtain one-dimensional nanowires, but to use a conductive substrate with a one-dimensional columnar structure vertically grown on it as an intermediate structure to fabricate an electrode structure of a lithium secondary battery different from a conventional structure. Therefore, in the embodiments of the present application, a thickened second metal layer is plated on the basis of the first metal layer after pre-plating the first metal layer, and the purpose of the embodiments is to make the insulating film have a certain electron channel by pre-plating the first metal layer, provide good electrical conditions for the plated thickened second metal layer, realize the adhesion of the thicker and denser second metal layer by electroplating, and mainly use the second metal layer as a conductive substrate capable of excellent conductivity and good structural support.

By the method for producing the template described above, it is possible to obtain a substrate having the following characteristics: the hole diameter of the through holes is 10 nm to 50 μm, the thickness of the film is 2 μm to 50 μm, the hole density of the through holes is $10^5/cm^2$ to $10^8/cm^2$, and the length-to-diameter ratio of the thickness of the film to the hole diameter of the through holes is 1:3 to 3:1. Preferably, the hole diameter of the through holes is 5 μm to 30 μm, the thickness of the film is 15 μm to 50 μm, the hole density of the through hole is $400000/cm^2$ to $2000000/cm^2$, and the length-to-diameter ratio of the thickness of the film to the hole diameter of the through holes is 1:1 to 3:1. The subsequently prepared lithium secondary battery electrode by the template within this structural parameter ranges has more optimized performance.

The hole diameter of the through holes is 10 nm to 50 μm including any point value within the hole diameter range, for example, the hole diameter of the through holes is 10 nm, 20 nm, 50 nm, 100 nm, 200 nm, 500 nm, 1 μm, 5 μm, 10 μm, 15 μm, 20 μm, 25 μm, 30 μm, 35 μm, 40 μm, 45 μm or 50 μm. The thickness of the film is 2 μm to 50 μm including any point value within the thickness range, for example, the thickness of the film is 2 μm, 5 μm, 10 μm, 15 μm, 20 μm, 25 μm, 30 μm, 35 μm, 40 μm, 45 μm or 50 μm. The hole density of the through holes is $10^5/cm^2$ to $10^8/cm^2$ including any point value within this density range, for example, the hole density of the through holes is $10^5/cm^2$, $10^6/cm^2$, $107/cm^2$, or $10^8/cm^2$. The length-to-diameter ratio of the thickness of the film to the hole diameter of the through holes is 1:3 to 3:1 including any point value within the ratio range, and for example, the length-to-diameter ratio of the thickness of the film to the hole diameter of the through holes is 1:3, 1:2, 1:1, 2:1, or 3:1. It should be noted that the length-to-diameter ratio in the embodiments of the present application refers to the ratio of the thickness of the film to the hole diameter of the through holes, that is, "length" of the length-to-diameter ratio refers to the thickness of the film, and "diameter" of the length-to-diameter ratio refers to the hole diameter of the through holes.

According to the structural parameters of the formed through holes, it can be seen that the embodiments of the present application can obtain a micron-level through-hole structure on the film of a flexible polymer film by an ion track etching process, which can meet the requirements of subsequent fabrication of one-dimensional columnar structure material and lithium secondary battery electrode, so that the lithium secondary battery electrode has more performance advantages than ordinary lithium secondary battery electrode because it can form a one-dimensional micron structure.

Among them, the hole diameter of the through holes, the thickness of the film, and the length-to-diameter ratio range determine the diameter, height, and length-to-diameter ratio of the one-dimensional columnar structure material subsequently grown in the through holes, which will further affect the related performance of the lithium secondary battery electrode. From a perspective of preparing lithium secondary battery electrodes and their applications in lithium batteries, the larger the length-to-diameter ratio, the better. But the applicant found that when the length-to-diameter ratio exceeds the ratio range of 1:3 to 3:1, it is necessary to make the thickness of the film thicker and/or etch the through holes into a smaller hole diameter, which not only improves the etching difficulty, but also leads to the difficulty of guaranteeing the rigidity of the one-dimensional columnar structure material subsequently grown in the through holes, making them prone to breakage. Therefore, in the present application, by controlling the key parameters of the ion track etching process, such as irradiation power, irradiation time, etching solution concentration and etching time, the length-to-diameter ratio of the thickness of the film to the diameter of the through holes is controlled within the range of 1:3 to 3:1, preferably in the range of 1:1 to 3:1, which is conducive to reduce the difficulty of etching and ensure the rigidity of the one-dimensional columnar structural material grown in the through holes, and can also make the one-dimensional columnar structure material optimize the performance of the further prepared lithium secondary battery electrode.

In yet another optional implementation, the step of synthesizing the template includes:

pre-treating the substrate for impurity removal;

coating a dry film on one side and/or both sides of the substrate after pre-treatment; and exposing, developing, and etching the dry film to obtain the template with the dry film formed with the through holes.

In the embodiments of the present application, in addition to using a specially treated adhesive layer to achieve the laminating of a film and a substrate or using a laminating method of directly forming a substrate material on the film with through holes, the laminating of the two can also be achieved by a process of etching a dry film on a substrate. In the related art, when performing dry film etching, an insulating substrate is generally used, and it is necessary to firstly form a layer of conductive film on the insulating substrate, then coat the dry film and photoresist, and perform etching. However, in the embodiments of the present application, since it is to be applied to the fabrication of a lithium secondary battery electrode, a conductive substrate is directly used as the substrate, and there is no need to additionally form a conductive film, which is more simplified in process and is more conducive to reducing the mass production cost of the template and the lithium secondary battery electrode prepared subsequently.

By the above-mentioned production method of the template, a substrate having the following features can be obtained: in the substrate, the hole diameter of the through holes is 5 μm to 30 μm, the thickness of the film is 5 μm to 30 μm, the length-to-diameter ratio of the thickness of the film to the diameter of the through holes is 1:3 to 3:1, and the pore spacing between adjacent through holes is 5 μm to 20 μm.

The hole diameter of the through holes is 5 μm to 30 μm including any point value within the range of hole diameter, for example, the hole diameter of the through holes is 5 μm, 10 μm, 15 μm, 20 μm, 25 μm or 30 μm. The thickness of the film is 5 μm to 30 μm including any point value within the thickness range, for example, the thickness of the film is 5 μm, 10 μm, 15 μm, 20 μm, 25 μm or 30 μm. The length-to-diameter ratio of the thickness of the film to the hole diameter of the through holes is 1:3 to 3:1 including any point value within the ratio range, and for example, the length-to-diameter ratio of the thickness of the film to the hole diameter of the through holes is 1:3, 1:2, 1:1, 2:1, or 3:1. It should be noted that the length-to-diameter ratio in the embodiments of the present application refers to the ratio of the thickness of the film to the hole diameter of the through holes, that is, "length" of the length-to-diameter ratio refers to the thickness of the film, and "diameter" of the length-to-diameter ratio refers to the hole diameter of the through holes. In addition, the pore spacing of adjacent through holes is 5 μm to 20 μm including any point value within the range of pore spacing, for example, the pore spacing of the adjacent through holes is 5 μm, 8 μm, 10 μm, 12 μm, 15 μm, 18 μm or 20 μm.

According to the structural parameters of the formed through holes, it can be seen that in the embodiments of the present application, a micron-level through-hole structure is obtained on the film of a flexible polymer film by an ion track etching process, which can meet the requirements of subsequent fabrication of one-dimensional columnar structure material and lithium secondary battery electrode, so that the lithium secondary battery electrode has more performance advantages than ordinary lithium secondary battery electrode because it can form a one-dimensional micron structure.

The hole diameter of the through holes, the thickness of the film, and the length-to-diameter ratio range determine the diameter, height, and length-to-diameter ratio of the one-dimensional columnar structure material subsequently grown in the through holes, which will further affect the related performance of the lithium secondary battery electrode. From a perspective of preparing lithium secondary battery electrodes and their applications in lithium batteries, the larger the length-to-diameter ratio, the better. But the applicant found that when the length-to-diameter ratio exceeds the ratio range of 1:3 to 3:1, it is necessary to make the thickness of the film thicker and/or etch the through holes into a smaller hole diameter, which not only improves the etching difficulty, but also leads to the difficulty of guaranteeing the rigidity of the one-dimensional columnar structure material subsequently grown in the through holes and be easy to break. Therefore, in this application, by controlling the key parameters of the ion track etching process, such as irradiation power, irradiation time, etching solution concentration and etching time, the length-to-diameter ratio of the thickness of the film to the hole diameter of the through holes is controlled within the range of 1:3 to 3:1, preferably 1:1 to 3:1, which helps to reduce the etching difficulty, can ensure the rigidity of the one-dimensional columnar structure material grown subsequently and can also make the one-dimensional columnar structure material optimize the performance of the further prepared lithium secondary battery electrode.

In addition, when the pore spacing between adjacent through holes is controlled within the above-mentioned range, an advantageous deposition space can be provided for coating active material in the lithium secondary battery electrode. And when the pore spacing is less than 5 μm, the number of through holes is too large and the distribution thereof is too dense, and although a large active area can be provided for the adhesion of the electrode active material, the gap reserved between the columnar one-dimensional columnar structure materials is also too small, which is disadvantageous for further depositing the electrode active material on a peripheral wall of these one-dimensional columnar structure materials. On the contrary, when the pore spacing is larger than 20 μm, the density of the through holes is low, and the adhesion area provided for the electrode active material is limited, which affects the subsequent loading amount of the electrode active material, and thus affects the capacity and other properties of the lithium secondary battery electrode.

Steps of growing and removing the film of the preparation method for this intermediate structure are described below.

Optionally, in the step of growing, a method of growing the conductive material in the through holes is one of physical vapor deposition, electroplating, chemical plating and chemical vapor deposition. Optionally, in the step of removing the film, a method of removing the film employs one of mechanical stripping, chemical etching and vacuum sintering.

When a metal such as copper or nickel is selected as the conductive material, copper or nickel can be deposited in the through holes of the template by a process such as physical vapor deposition (such as magnetron sputtering or evaporation), electroplating or chemical plating, and a resulting composite structure may be, for example, a composite structure such as a copper foil substrate-copper column one-dimensional columnar structure, a copper foil substrate-nickel column one-dimensional columnar structure, a nickel foil substrate-nickel column one-dimensional columnar structure, a nickel foil substrate-copper column one-dimensional columnar structure, and in addition, a copper foil substrate-carbon-based one-dimensional columnar structure. When the temperature resistance of the substrate and the film is good, the chemical vapor deposition process can also be selected to grow the one-dimensional columnar structure.

In the intermediate structure obtained by the above-mentioned manufacturing method, since the one-dimensional columnar structure is grown in the through holes of the template, the structural parameters thereof are similar to those of the through holes. The diameter of the one-dimensional columnar structure is 5 nm 30 μm, the height of the one-dimensional columnar structure is 15 μm 50 μm, and the length-to-diameter ratio of the one-dimensional columnar structure is 3:1 to 1:1. When the structural parameters of the one-dimensional columnar structure are controlled within the above-mentioned range, difficulty of mass-production process and performances of finally prepared lithium secondary battery electrodes may be well balanced, and the lithium secondary battery electrode with stable structural parameters and optimized performance may be prepared with a mass-production process which is easy to realize.

The diameter of the one-dimensional columnar structure is 5 μm to 30 μm including any point value within the diameter range, for example, the diameter of the one-dimensional columnar structure is 5 μm, 10 μm, 15 μm, 20 μm, 25 μm or 30 μm. The height of the one-dimensional columnar structure is 15 μm to 50 μm including any point value within the range of height, for example, the height of the one-dimensional columnar structure is 15 μm, 20 μm, 25 μm, 30 μm, 35 μm, 40 μm, 45 μm or 50 μm. The height-to-diameter ratio of the one-dimensional columnar structure is 3:1 to 1:1, including any point value in the height-to-diameter ratio range, for example, the height-to-diameter ratio of the one-dimensional columnar structure is 3:1, 2.5:1, 2:1, 1.5:1, or 1:1.

Further, the one-dimensional columnar structures may be regularly or irregularly distributed on the substrate according to a manufacturing method for the template. In the art, both regularly and irregularly distributed one-dimensional columnar structures can be called columnar array structures. When the one-dimensional columnar structures are regularly distributed on the substrate, the one-dimensional columnar structures include a plurality of regularly distributed columns, and the spacing between adjacent columns is 5 μm to 20 μm.

Among them, the spacing of adjacent columns is 5 μm to 20 μm including any point value within the range of spacing, for example, the spacing of the adjacent columns is 5 μm, 8 μm, 10 μm, 12 μm, 15 μm, 18 μm or 20 μm.

The applicant has found that when the spacing between adjacent columns is greater than 20 μm, the number of one-dimensional columnar structures per unit area on the substrate is less, the space utilization rate is low, and a surface area available for subsequent electrode active material deposition is small. When the spacing between adjacent columns is less than 5 μm, the spacing between adjacent columns is too small, which may increase the difficulty of subsequent deposition of the electrode active material on the sidewalls of the columns and/or further coating with other materials, and may result in insufficient space reserved for the radial expansion of the electrode active material during the charge-discharge cycle, which is unfavorable for the performance optimization of the lithium secondary battery.

In a second aspect, the embodiments of the present application further provide a lithium secondary battery electrode, specifically a lithium secondary battery negative electrode, the lithium secondary battery electrode including:

a substrate, wherein the substrate is a conductive substrate;

a one-dimensional columnar structure grown on the substrate and perpendicular to a plane where the substrate is located, wherein the one-dimensional columnar structure is a conductive structure;

an active material layer located on the substrate and perpendicular to the plane where the substrate is located, wherein the active material layer covers an outer surface of the one-dimensional columnar structure; and a protective layer located on the substrate and perpendicular to the plane where the substrate is located, wherein the protective layer covers an outer surface of the active material layer.

A preparation method for this lithium secondary battery electrode includes the following steps:

coating an outer surface of the one-dimensional columnar structure of the intermediate structure prepared by the preparation method according to the first aspect with electrode active material and forming the active material layer; and coating the protective layer on an outer surface of the active material layer and obtaining the lithium secondary battery electrode.

Optionally, the electrode active material is at least one of silicon, germanium, or tin. Optionally, material of the protective layer is carbon or metal oxide. Optionally, a method of coating the electrode active material includes chemical vapor deposition, physical vapor deposition and electroplating. Optionally, a method of coating the protective layer includes hydrothermal, physical vapor deposition or chemical vapor deposition.

The lithium secondary battery electrode structure is an electrode material in which the one-dimensional columnar structures are coaxially laminated. The substrate is used as a current collector of the lithium secondary battery electrode. The one-dimensional columnar structures are arranged perpendicular to the current collector, and the outer surface of the one-dimensional columnar structure, which serves as a core layer, is sequentially covered with the active material layer and the protective layer for forming the lithium secondary battery electrode. Compared with the battery structure in which the electrode active material is laid flat on the current collector, this structure in which all the one-dimensional columnar structures are perpendicular to the current collector can improve the overall conductive environment of the lithium secondary battery electrode.

Specifically, the one-dimensional columnar structure, which serves as the core layer perpendicular to the substrate, can play an effective supporting role and provide a conductive channel for charging and discharging electrons perpendicular to the substrate, and when the one-dimensional columnar structure is used in the lithium secondary battery electrode structure, there is no need for an additional conductive agent. The active material layer of the electrode can directly cover the surface of the substrate and the core layer by physical vapor deposition, chemical vapor deposition, electroplating or the like, and there is no need for an additional binder. The outermost protective layer keeps coaxial with the one-dimensional columnar structure core layer and the active material layer.

The electrode active material in the lithium secondary battery electrode having a coaxial structure may be at least one of silicon, silicide, germanium or tin. In particular, when silicon, silicide or the like is used as the active material layer, the obtained columnar array structure electrode active material not only has the advantage of high capacity per gram (the theoretical maximum lithium intercalation capacity of a silicon negative electrode material is up to 4200 mAh/g, much higher than that of the current graphite anode), but also can solve the problem of poor conductivity of the silicon-based negative electrode material by utilizing good electrical contact between the conductive core layer and the conductive substrate. In addition, the presence of axial gaps between adjacent columns of the one-dimensional columnar structures can effectively buffer the volume change of the active material layer during charging and discharging, release stress and improve cycling stability.

In addition, the protective layer may cover the outside of the active material layer by a hydrothermal process, physical vapor deposition, chemical vapor deposition or the like, and a thickness of the protective layer is less than a thickness of the active material layer, i.e., the protective layer has a smaller thickness. Thus, the presence of the protective layer can effectively avoid direct contact between the active material layer and the electrolyte in the lithium secondary battery, thereby reducing the irreversible loss of the lithium source and further suppressing the volume expansion during cycling.

In order to explain the technical solutions and technical effects of the present application in more detail, the embodiments of the present application will be further explained through more specific embodiments, application examples and performance test results.

Embodiment I

Figure 2:
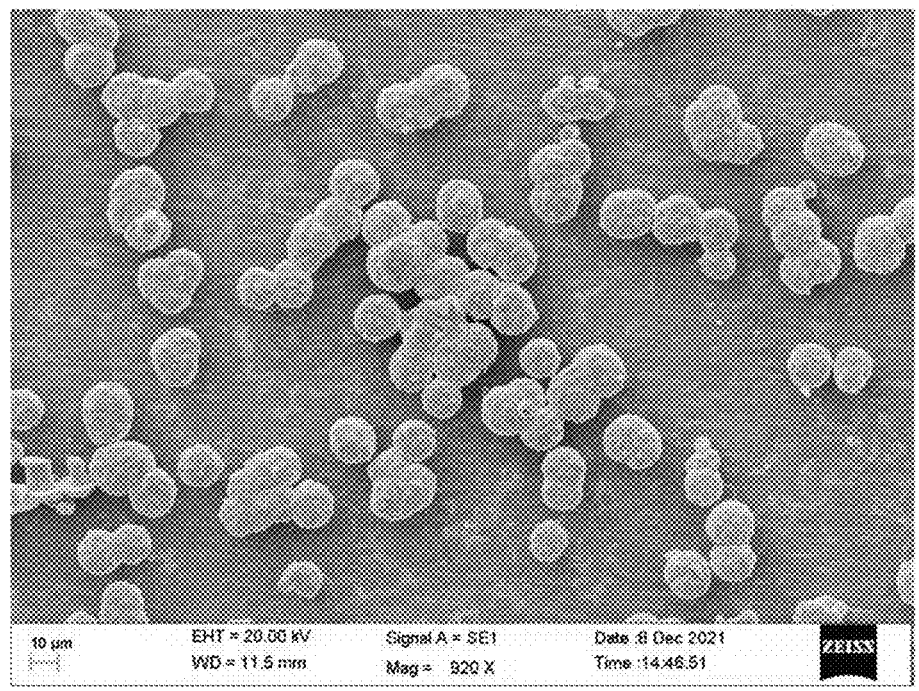
FIG. 2 is a scanning electron micrograph of an intermediate structure according to Embodiment I.
Figure 3:
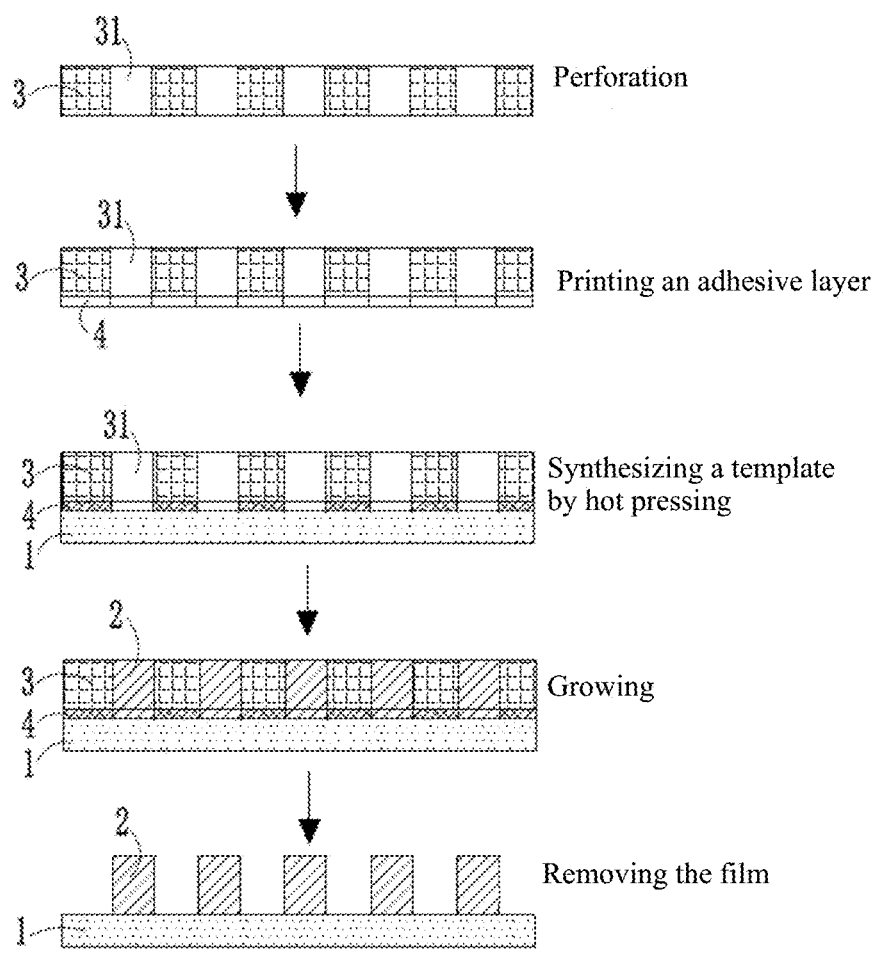
FIG. 3 is a schematic view showing a process for preparing an intermediate structure according to Embodiment I.

Referring to FIG. 1, this embodiment provides an intermediate structure for preparing a lithium secondary battery electrode on one side, including: a substrate 1, a one-dimensional columnar structure 2 perpendicularly growing on the substrate 2, wherein the substrate 1 is a copper foil substrate 1 and the one-dimensional columnar structure 2 is a one-dimensional copper column structure. The one-dimensional columnar structure perpendicular to the substrate 1 in this intermediate structure has the following structural parameters: the diameter of the one-dimensional columnar structure 2 is 5 μm to 10 μm, the height of the one-dimensional columnar structure 2 is 15 μm, and the height-to-diameter ratio of the one-dimensional columnar structure 2 is 3:1 to 3:2. FIG. 2 is a scanning electron micrograph of an intermediate structure according to this embodiment;

As shown in FIG. 3, the preparation method of the intermediate structure includes the following steps:

synthesizing a template: laminating a film 3 on one side of the substrate 1 and forming the film 3 with through holes 31, central axes of the through holes 31 being perpendicular to a plane of the substrate 1; and the film 3 is a flexible PC film;

growing: growing metallic copper in the through holes 31 by a physical vapor deposition process such that the one-dimensional columnar structure 2 perpendicular to the substrate 1 are formed in the through holes 31; and removing the film 3: removing the film 3 of the template by a mechanical peeling process to obtain an intermediate structure according to this embodiment.

Among them, the step of synthesizing the template includes:

perforation: the film 3 is processed by an ion track etching process to obtain the through holes 31, and the adhesive layer 4 is screen printed on the film 3 having the through holes 31, and the adhesive layer 4 does not cover the through holes 31 so that the through holes 31 are exposed; the conditions of the ion track etching process include: heavy ion bombardment, irradiation at an irradiation power of 5000 KW for 200 s, selecting a sodium hydroxide solution with a mass fraction of 20% as an etching solution for the film 3, etching for 20 min, so that the through holes 31 are formed on the film 3; PVDF is used as the adhesive layer 4, an NMP etching solution is selected for the adhesive layer 4, and the adhesive layer 4 is etched so that the adhesive layer 4 does not cover the through holes 31 of the film 3; and hot pressing: the film 3 on which the adhesive layer 4 is formed is bonded to the copper foil substrate 1 by hot pressing through the adhesive layer 4 to obtain a template, and since the adhesive layer 4 is subjected to a special perforation treatment, the through holes 31 of the template are communicated with the copper foil substrate 1.

Figure 4:
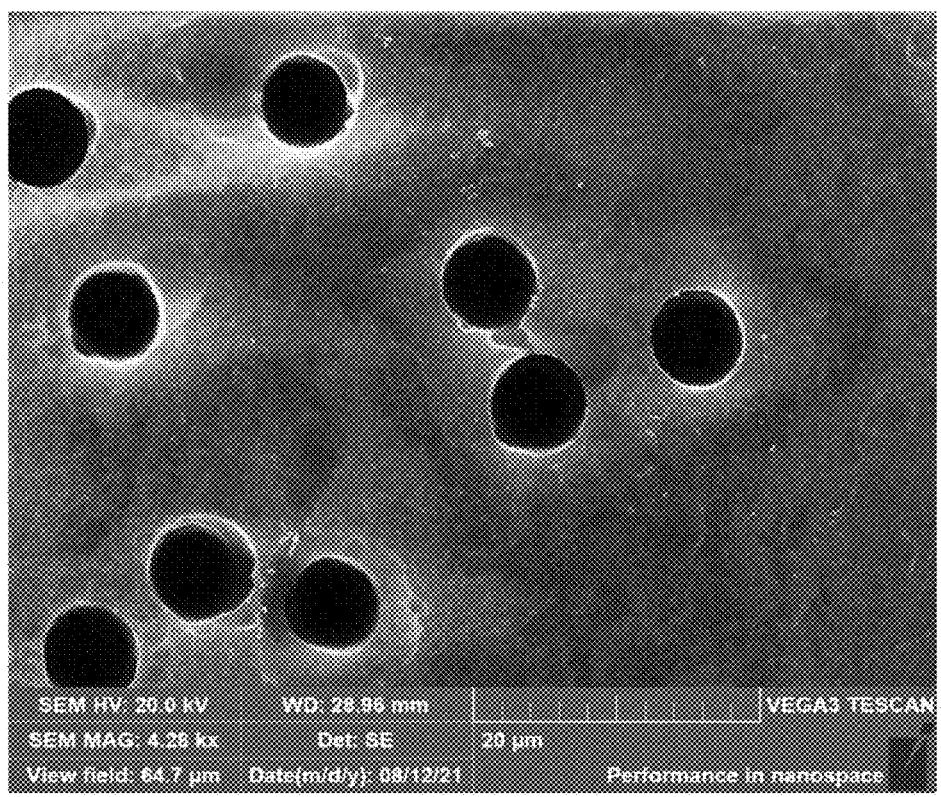
FIG. 4 is a scanning electron micrograph of a template synthesized during the preparation of an intermediate structure according to Embodiment I.

The template obtained by the above-mentioned production method has a hole diameter of the through holes 31 of 5 μm to 10 μm, a thickness of the film 3 of 15 μm, and a hole density of the through holes 31 of $4\times10^6/cm^2$. FIG. 4 is a scanning electron microscope diagram of the template of the present embodiment, and it can be seen from this diagram that the through holes obtained in the present embodiment show an irregular distribution in the film.

It should be noted that although the through holes obtained by the ion track etching process are irregularly distributed, since the present embodiment is to utilize the template for the preparation of intermediate structures as well as lithium secondary battery electrodes in bulk, that is, the template is used in the field of production of electrode materials for lithium secondary batteries, the number of through holes on the film is particularly important for the template. This is because the number of through holes in the template determines the number of one-dimensional columnar structures grown in the through holes when the intermediate structure is fabricated, and then determines the active material loading amount of the final prepared lithium secondary battery electrodes, which directly affects the electrical performance of lithium secondary battery electrodes. In addition, with regard to the regularity of the distribution of the through holes, the distribution of the through holes can be made closer to a regular uniform distribution to a certain extent by increasing the hole density. Specifically, in this embodiment, since FIG. 4 enlarges the through holes of the template by a certain factor, it shows an irregular distribution. But since the hole density of the through holes can reach $4\times10^6/cm^2$, so from the overall point of view, the template can meet the performance requirements for subsequent fabrication of lithium secondary battery electrodes in terms of the number of holes.

Figure 5:
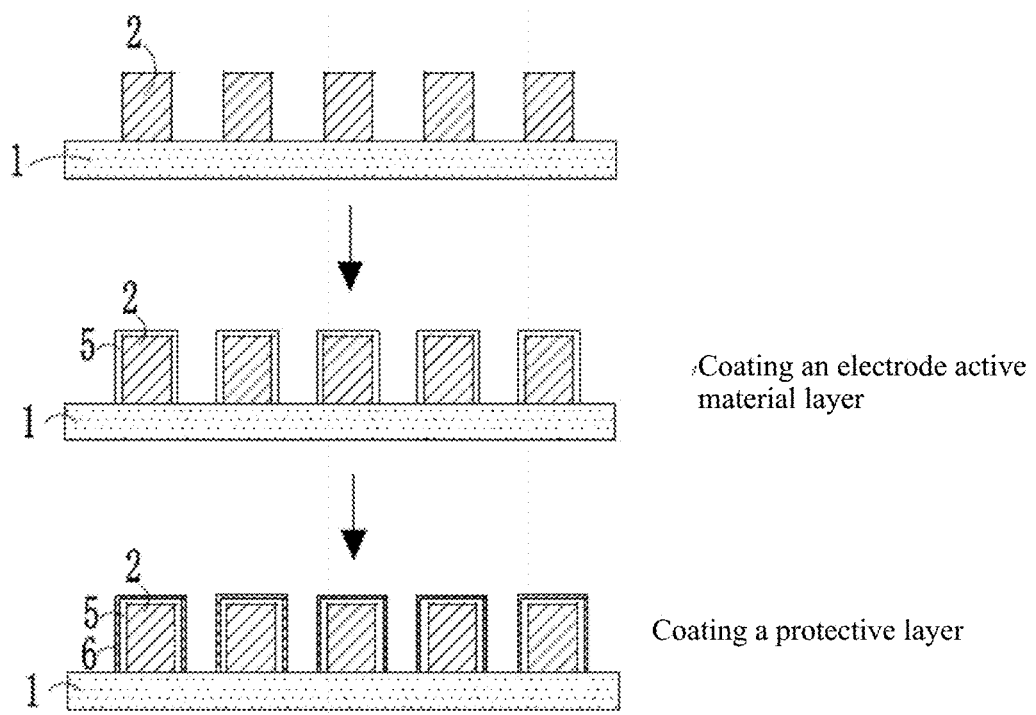
FIG. 5 is a schematic view showing a process for preparing a lithium secondary battery electrode according to Embodiment I.

This embodiment further provides a lithium secondary battery electrode, specifically a lithium secondary battery negative electrode. As shown in FIG. 5, the lithium secondary battery electrode includes: a substrate 1, one-dimensional column structure, an active material layer 5 using silicon as an electrode active material and covering an outer surface of the one-dimensional column structure, and a carbon-based protective layer 6 covering an outer surface of the active material layer 5. The one-dimensional column structure grows on the substrate 1 and are perpendicular to a plane where the substrate 1 is located. Both the active material layer 5 and the protective layer 6 are perpendicular to the plane where the substrate 1 is located and are located on the substrate 1. Thereby, the lithium secondary battery electrode, which includes the substrate 1 serving as a current collector, and the core layer one-dimensional copper column structure, the active material layer 5 and the protective layer 6 that are perpendicular to the copper foil substrate 1 and coaxially arranged, is formed.

As shown in FIG. 5, a preparation method for this lithium secondary battery electrode includes the following steps:
  covering an outer surface of the one-dimensional column structure of the intermediate structure according to the present embodiment with a silicon electrode active material by physical vapor deposition to form an active material layer 5; and
  covering an outer surface of the active material layer 5 with a carbon-based protective layer 6 by physical vapor deposition to obtain the lithium secondary battery electrode.

Embodiment II

This embodiment differs from Embodiment I only in that the ion track etching process conditions in the step of synthesizing the template in this embodiment are different. And in the step of synthesizing the template in this embodiment, the ion track etching process conditions include: heavy ion bombardment, irradiating at an irradiation power of 10000 KW for 0.5 s, and a sodium hydroxide solution with a mass fraction of 50% is selected as an etching solution to etch the film for 5 min so as to form through holes in the film.

Embodiment III

This embodiment differs from Embodiment I only in that the ion track etching process conditions in the step of synthesizing the template in this embodiment are different. And in the preparation method of the template in this embodiment, the ion track etching process conditions includes: heavy ion bombardment, irradiating at an irradiation power of 2000 KW for 20 s, and a sodium hydroxide solution with a mass fraction of 20% is selected as an etching solution for the film and etching for 30 min so as to form through holes in the film.

Embodiment IV

This example differs from Embodiment I only in that the substrate of this embodiment is a nickel foil substrate, the film is a flexible PET film, and the step of synthesizing the template of this embodiment is different.

In this embodiment, the step of synthesizing the template includes:
  coating the adhesive layer: coating the adhesive layer on the film which has not form the through holes and making the adhesive layer uniform and dense;
  perforation: processing the film coated with the adhesive layer by an ion track etching process and forming the through holes on both of the adhesive layer and the film; wherein the conditions of the ion track etching process include: heavy ion bombardment, irradiation at an irradiation power of 5000 KW for 200 s, selecting a sodium hydroxide solution with a mass fraction of 20% as an etching solution for the film, etching for 20 min, so that the through holes are formed on the film; PVDF is used for the adhesive layer, an NMP etching solution is selected for etching the adhesive layer, so that the adhesive layer does not cover the through holes of the film; and
  hot pressing: bonding the film formed with the through holes to the nickel foil substrate by hot pressing through the adhesive layer formed with the through holes to obtain the template, and since the film layer and the adhesive layer are subjected to a special perforation treatment, the through holes of the template are communicated with the nickel foil substrate.

The template obtained by the above steps has a hole diameter of the through holes of 5 μm to 10 μm, a thickness of the film of 15 μm to 50 μm, and a hole density of the through holes of $10^5/cm^2$ to $10^8/cm^2$.

Embodiment V

This embodiment differs from Embodiment I only in that the film of this embodiment uses a flexible PI film, the step of synthesizing the template of this embodiment is different, and the one-dimensional columnar structure of this embodiment is a one-dimensional nickel columnar structure.

In this embodiment, the step of synthesizing the template includes:
  coating the adhesive layer: coating the adhesive layer on the film which has not form the through holes and making the adhesive layer uniform and dense;
  hot pressing: bonding the film formed with the adhesive layer with the substrate through the adhesive layer by hot pressing; and
  perforation: processing the film and the adhesive layer which are bonded to the substrate by an ion track etching process and forming the through holes on both of the adhesive layer and the film; wherein the conditions of the ion track etching process include: heavy ion bombardment, irradiation at an irradiation power of 5000 KW for 200 s, selecting a sodium hydroxide solution with a mass fraction of 20% as an etching solution for the film, etching for 20 min, so that the through holes are formed on the film; PVDF is selected as the adhesive layer, an NMP etching solution is selected for etching the adhesive layer, so that the adhesive layer does not cover the through holes of the film.

Due to the special perforation treatment of the film layer and the adhesive layer, the through holes of the template communicate with the substrate.

The template obtained by the above-mentioned production method has a hole diameter of the through holes of 5 μm to 10 µm, a thickness of the film of 15 µm to 50 µm, and a hole density of the through holes of $10^5/cm^2$ to $10^5/cm^2$.

Embodiment VI

This embodiment differs from Embodiment I only in that the step of synthesizing the template is different, and the electrode active material used for the active material layer in the lithium secondary electrode is different.

In this embodiment, the step of synthesizing the template includes:

perforation: subjecting the film to the ion track etching process to obtain the through holes;

pre-plating: pre-plating a first metal layer on the film formed with the through holes by physical vapor deposition; and electroplating a second metal layer on the first metal layer to form a substrate, and plating the substrate on the film formed with the through holes to form a template, wherein both the second metal layer and the first metal layer are copper layers, and the thickness of the second metal layer is greater than that of the first metal layer.

In addition, in the lithium secondary battery electrode, a germanium active material is used as the active material layer.

Embodiment VII

This embodiment differs from Embodiment I only in that the step of synthesizing the template is different, and the electrode active materials used for the active material layer in the lithium secondary electrode are different.

In this embodiment, the step of synthesizing the template includes:

pre-treating: pre-treating the substrate for impurity removal, specifically pre-treating the substrate for removing oil and impurities;

coating a dry film: coating a dry film on one side of the substrate after pre-treatment; and perforation: exposing, developing, and etching the dry film to obtain the template with the dry film formed with the through holes.

The template obtained by the above-mentioned preparation method has regularly distributed through holes 31. The hole diameter of the through holes 31 is 5 µm to 30 µm, the thickness of the film is 5 µm to 30 µm, the length-to-diameter ratio of the thickness of the film to the hole diameter of the through holes is 1:3 to 3:1, and the pore spacing between adjacent through holes is 5 µm to 20 µm.

In addition, in the lithium secondary battery electrode, a tin active material is used as the active material layer.

Embodiment VIII

Figure 6:
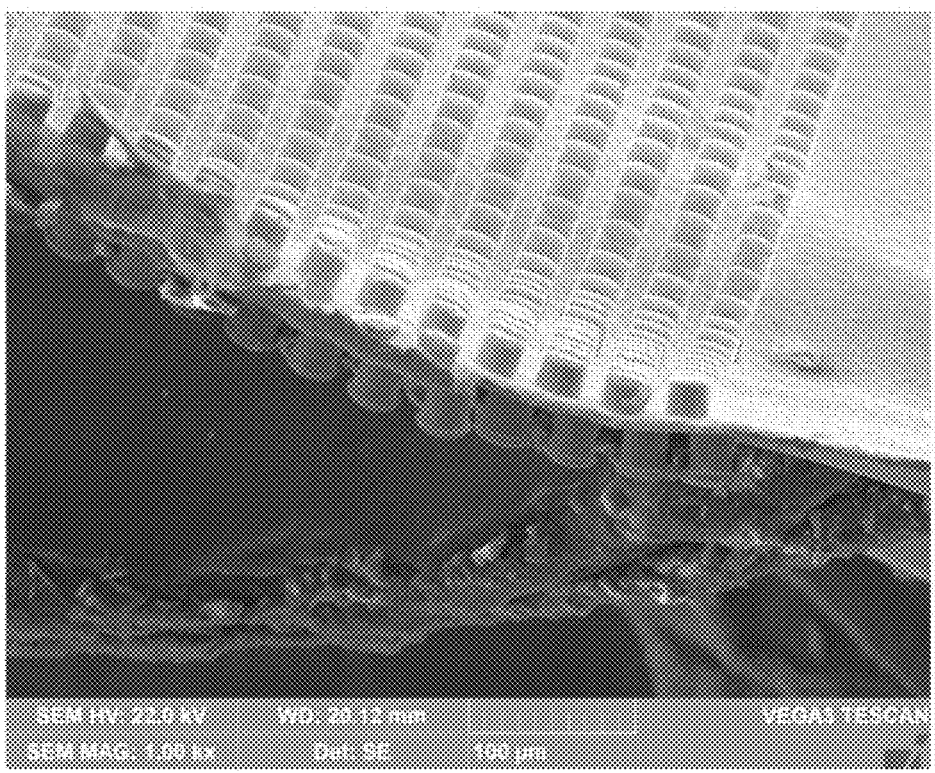
FIG. 6 is a schematic view showing a structure of an intermediate structure according to Embodiment VIII.

This embodiment differs from Embodiment VII only in that in this embodiment, a film with through holes is laminated on both the upper and lower surfaces of the copper foil substrate, namely, the template is a template with double-sided through holes. The intermediate structure prepared using the template of this embodiment also has the one-dimensional copper columnar structure grown on both sides of the substrate. As shown in FIG. 6, it is a scanning electron micrograph of the intermediate structure of this embodiment. Further, in the lithium secondary battery electrode prepared by using the intermediate structure of this embodiment, the coaxial one-dimensional columnar structures are also formed on both sides of the copper foil substrate.

Comparative Example

This comparative example differs from Embodiment I only in that this comparative example does not use a template to fabricate an intermediate structure and a lithium secondary battery electrode, but directly uses the same electrode fabrication conditions as in Embodiment I to fabricate a lithium secondary battery electrode on a substrate. That is, in this comparative example, a silicon electrode active material is directly deposited on a copper foil substrate by a physical vapor deposition process to form an active material layer lying on the copper foil substrate, and then a carbon-based protective layer is deposited on the active material layer by the physical vapor deposition process to obtain a lithium secondary battery electrode.

Performance Testing

Figure 7:
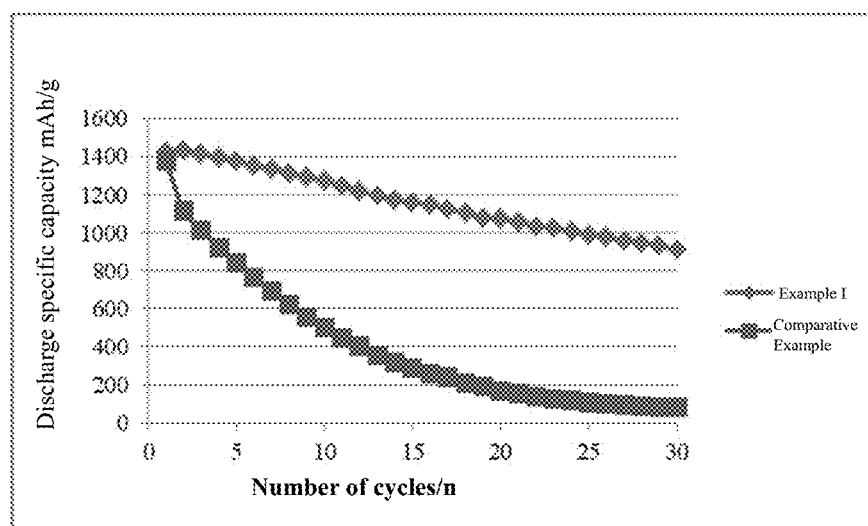
FIG. 7 is a graph of cycle performance test results of button cells assembled in Embodiment I and Comparative Example.

The lithium secondary battery electrodes of Embodiment I and Comparative Example are assembled as battery negative electrodes together with other conventional lithium secondary battery materials into button cells, and the cycle performance test is performed, and the results are shown in FIG. 7. The cycle performance test results show that the gram capacity test result of the button cell assembled with the lithium secondary battery electrode of Embodiment I is about 1426 mAh/g, and the discharge capacity retention rate is 64% after 30 cycles. However, the button cell assembled with the electrode of the lithium secondary battery of Comparative Example has an initial gram capacity of about 1347 mAh/g and a discharge capacity retention rate of only 6% after 30 cycles.

As can be seen, in this comparative experiment, although the loading levels of the active materials on the lithium secondary battery electrodes in Embodiment I and the comparative example are the same, causing the lithium secondary batteries assembled using these two lithium secondary battery electrodes to have similar initial capacities per gram, the discharge specific capacity of the lithium secondary battery in the comparative example decreases significantly with the progress of the cycling performance test experiment. This is because the battery negative electrode in the comparative example is a silicon film negative electrode. This silicon film negative electrode has large volume expansion during the charge-discharge cycling, which leads to separation and loss of electrical contact between the silicon particles and between the silicon and the copper foil current collector interface under stress, eventually causing rapid capacity fading and a discharge capacity retention rate after 30 cycles of only 6%. As can be seen from the results of the performance test on the lithium secondary battery electrode of Embodiment I, in the embodiment of this application, since the conductive material is perpendicularly grown on the copper foil current collector as the conductive one-dimensional columnar structures and the peripheral wall of the one-dimensional columnar structure material is sequentially covered with the silicon active material and the protective layer, the gap reserved between the adjacent one-dimensional columnar structures can effectively buffer the volume expansion of the silicon active material during the charge-discharge cycling and alleviate separation and loss of electrical contact due to the expansion of the silicon active material, thereby greatly improving the cycling stability of the lithium secondary battery.

The intermediate structure for preparing a lithium secondary battery electrode and a preparation method therefor, and a lithium secondary battery electrode and a preparation method therefor disclosed in the embodiments of the present application are described in detail above. Specific examples are used herein to illustrate the principle and implementations of the present application. The descriptions of the above embodiments are only used to help understand the technical solution of the present application and core ideas thereof. Moreover, for those of ordinary skill in the art, according to the ideas of the present disclosure, there will be changes in the specific implementations and the scope of application. In summary, the content of this specification should not be construed as limiting the present disclosure.

What is claimed is:

1. A preparation method for an intermediate structure, wherein the intermediate structure is used for preparing a lithium secondary battery electrode on one side or both sides of the intermediate structure, the preparation method for the intermediate structure comprises steps of:
    synthesizing a template: subjecting a film to an ion track etching process to obtain a through holes; pre-plating a first metal layer on the film formed with through holes by physical vapor deposition; plating a second metal layer on the first metal layer to form a substrate such that the film formed with the through holes is plated onto the substrate to form the template; wherein, central axes of the through holes being perpendicular to a plane of the substrate, the substrate is a conductive substrate, and the film is a polymer film which is flexible, the polymer film is at least one of a PTFE film, a PET film, a PP film, a PC film, and a PI film;
    growing: growing conductive material in the through holes such that a one-dimensional columnar structure perpendicular to the substrate is formed in the through holes; wherein, a diameter of the one-dimensional columnar structure is 5 μm to 30 μm, a height of the one-dimensional columnar structure is 15 μm to 50 μm, and a height-to-diameter ratio of the one-dimensional columnar structure is 3:1 to 1:1; and
    removing the film: removing the film and obtaining the intermediate structure.

2. The preparation method for the intermediate structure according to claim 1, wherein, conditions of the ion track etching process comprise: bombarding with heavy ions and irradiating at an irradiation power of 2000 KW to 10000 KW for 0.5 s to 200 s; and/or,
    conditions of the ion track etching process comprise: an etching solution is an alkaline solution, and etching time is 5 min to 30 min.

3. The preparation method for the intermediate structure according to claim 1, wherein a diameter of the through holes is 10 nm to 50 μm, and/or,
    an areal density of the through holes is $10^5$ holes/cm$^2$ to $10^8$ holes/cm$^2$, and/or
    a thickness of the film is 2 μm to 50 μm, and/or
    a length-to-diameter ratio of the thickness of the film to the hole diameter of the through holes is 1:3 to 3:1.

4. The preparation method for the intermediate structure according to claim 3, wherein the diameter of the through holes is 5 μm to 30 μm, and/or,
    an areal density of the through holes is 400000 holes/cm$^2$ to 2000000 holes/cm$^2$, and/or
    the thickness of the film is 15 μm to 50 μm, and/or
    the length-to-diameter ratio of the thickness of the film to the hole diameter of the through holes is 1:1 to 3:1.

5. The preparation method for the intermediate structure according to claim 1, wherein, in the step of growing, a method of growing the conductive material in the through holes is one of physical vapor deposition, electroplating, chemical plating and chemical vapor deposition; and/or,
    in the step of removing the film, a method of removing the film employs one of mechanical stripping, chemical etching or vacuum sintering.

6. The preparation method for the intermediate structure according to claim 1, wherein the one-dimensional columnar structure comprises a plurality of regularly distributed columns, and a spacing between adjacent columns is 5 μm to 20 μm; or, the one-dimensional columnar structure comprises a plurality of irregularly distributed columns.

7. The preparation method for the intermediate structure according to claim 1, wherein the substrate is at least one of a copper foil substrate, a nickel foil substrate, and a stainless steel substrate;
    the conductive material is at least one of copper, nickel or carbon.

8. A preparation method for a lithium secondary battery electrode, wherein the preparation method for the lithium secondary battery electrode comprises steps of:
    coating an outer surface of the one-dimensional columnar structure of the intermediate structure prepared by the preparation method according to claim 1 with electrode active material and forming an active material layer; and
    coating a protective layer on an outer surface of the active material layer and obtaining the lithium secondary battery electrode.

9. The preparation method for the lithium secondary battery electrode according to claim 8, wherein the electrode active material is at least one of silicon, germanium, and tin; and/or,
    material of the protective layer is carbon or metal oxide; and/or,
    a method of coating the electrode active material comprises chemical vapor deposition, physical vapor deposition or electroplating; and/or,
    a method of coating the protective layer comprises hydrothermal, physical vapor deposition or chemical vapor deposition.

* * * * *